United States Patent [19]
Walker

[11] Patent Number: 4,810,196
[45] Date of Patent: Mar. 7, 1989

[54] MANNEQUIN FOR USE IN TEACHING COSMETOLOGY

[76] Inventor: Mary E. Walker, Rt. 4, Box 374, Siler City, N.C. 27344

[21] Appl. No.: 109,466

[22] Filed: Oct. 16, 1987

[51] Int. Cl.⁴ ............................................. G09B 19/10
[52] U.S. Cl. ...................................... 434/94; 434/270
[58] Field of Search ................... 434/94, 98, 99, 371, 434/377, 270

[56] References Cited

U.S. PATENT DOCUMENTS

| | | | |
|---|---|---|---|
| 2,919,702 | 1/1960 | Olivo | 434/94 XL |
| 3,325,917 | 6/1967 | Kinnaman | 434/94 |
| 3,458,943 | 8/1969 | Trowbridge | 434/94 |
| 4,317,462 | 3/1982 | Steiner | 434/94 XL |
| 4,403,963 | 9/1983 | La Vista | 434/94 |

Primary Examiner—Ira S. Lazarus
Assistant Examiner—Peggy Neils
Attorney, Agent, or Firm—Charles R. Rhodes; Judith E. Garmon

[57] ABSTRACT

A mannequin for use as a tool in demonstrating a variety of hair styling techniques such as hair cutting, permanent waving, blending, texturizing and the like includes a simulated human head having a skull, scalp, and human hair attached to the scalp. The hair is of a length and thickness approximating that of an individual of a prescribed sex, size, and type. In a preferred embodiment as used for demonstrating hair cutting techniques, a plurality of variously colored line diagrams are applied to the hair to defined a plurality of cutting lines to be followed to accomplish a plurality of prescribed hair styles.

9 Claims, 3 Drawing Sheets

MANNEQUIN FOR USE IN TEACHING COSMETOLOGY

BACKGROUND AND SUMMARY OF THE PRESENT INVENTION

In the cosmetology profession the approach to training has, for several decades, involved a series of lectures and demonstrations wherein an instructor demonstrates various techniques to a number of students. The students are then instructed to return to a work station and practice the specific technique. With regard to the styling of hair—either by cutting, coloring, perm waving or the like—the student performs the various operations or techniques on a mannequin. The conventional hairdresser's mannequin is constructed to give the appearance of the adult human head, generally that of the female, and includes human hair of approximately shoulder length. These mannequins generally have shoulder length or longer hair so that several hair cuts or waving techniques can be achieved on one mannequin.

What frequently happens, however, is that the student watches an instructor demonstrate a technique of, for example, cutting the hair. The student then returns to the work station and, when trying to reproduce the demonstrated cut, takes off far too much hair from the mannequin. Such occurrences are particularly frequent at the early stages of training. Therefore, where the mannequins are intended to be subject to multiple progressive cuttings from longer to shorter hair styles, the lack of training frequently causes the student to get only two or three cuts. The mannequins must then be replaced.

Not only is such a training method somewhat expensive, but it leaves the students to their own means in developing the skills necessary to properly style hair. Hair styling is not only the cutting of hair with scissors or blade, but is also the skills of: sectioning hair, determining the right cutting angle for selected portions, determining the appropriate lengths, and the like. Most such skills must be developed through actual performance of these acts and the fine tuning of visual and tactile senses. While trial and error is one approach to such training, such an approach can leave the less confident student feeling inadequate and unable to perform. Additionally, replacement of poorly utilized mannequins is a considerable expense.

The present invention not only overcomes these above-described problems, but also is believed to be such a unique approach to cosmetology training as to be considered revolutionary. The invention is not only a uniquely designed mannequin, but also a highly improved method of training students to style hair. The education package according to a preferred embodiment includes a mannequin having a plurality of diagrams imprinted on the hair to guide a student in the performance of selected styling technique. Each mannequin is designed for completion of a multiplicity of styling techniques, and is accompanied by an instructional manual with diagrammatic drawings and written instructions for performing the selected techniques.

In the preferred embodiment the mannequin is made to resemble the human head, male or female. It includes a face portion, a scalp portion, neck, and has human hair attached to the scalp. The female model will be described and illustrated herein. However, such illustrations are examples only and it must be understood that the mannequins are provided in either sex and in adult or child sizes.

The hair which is attached to the scalp by conventional means is human hair of a length and thickness appropriate to the prescribed human counterpart. The color of the hair is preferably light blond, although is some embodiments other colors are acceptable. For most female models, the mannequin should have hair approximately of soulder length. By beginning with longer styles, each cut (if the technique being taught is hair cutting) can be progressively shorter in length until the hair is substantially cut away.

To diagram the hair for cutting, hair is sectioned along colored lines printed on the scalp, and then cut along a selected one of several color-coded patterns which are imprinted in diagrammatic form on the hair strands. This color-coding will be more clearly understood from the detail below. By sectioning and cutting along specified cutting lines according to an accompanying written instruction, the student can complete a correctly styled cut early in his/her training.

Each colored diagram as shown in the drawings is of a width permitting the specific hair style to be cut two or more times. Therefore, the experience level of the student is increased in a controlled, but positive manner. For example, a student can cut away one-third to one-half of a selected color-coded diagram. The instructor then reviews the work and the student repeats the cut, cutting away the final portion of the colored diagram. Therefore, the instructor and the student are encouraged to more positive interaction that will consistently guide the student. The student initially watches the instructor complete a cut and then utilizes the instruction manual and the color-coded mannequin to perform the task herself.

As described herein, the color-coded diagrams are imprinted on the hair with colored inks or acrylics which do not rub off, flake, or otherwise damage the hair. It is anticipated, howevver, that invisible inks which are revealed only under ultraviolet lights might also be used.

It was therefore a primary objective of the present invention to provide an improved mannequin of the type used for cosmetology training. A further objective was the provide an improved mannequin of the type used for cosmetlogy training. A further objective was the provision of such a mannequin which would be susceptible to performance of multiple styling techniques thereon. Other major objectives were the provision of a teaching mannequin that would improve the progressive training of the student and provide positive reinforcement of self-confidence, and the provision of a highly unique and efficient method of training cosmetologists.

Other and further objectives will become apparent to those skilled in the art as the following detailed description is studied in conjunction with the accompanying drawings.

DETAILED DESCRIPTION OF A PREFERRED EMBODIMENT

Figure 1:
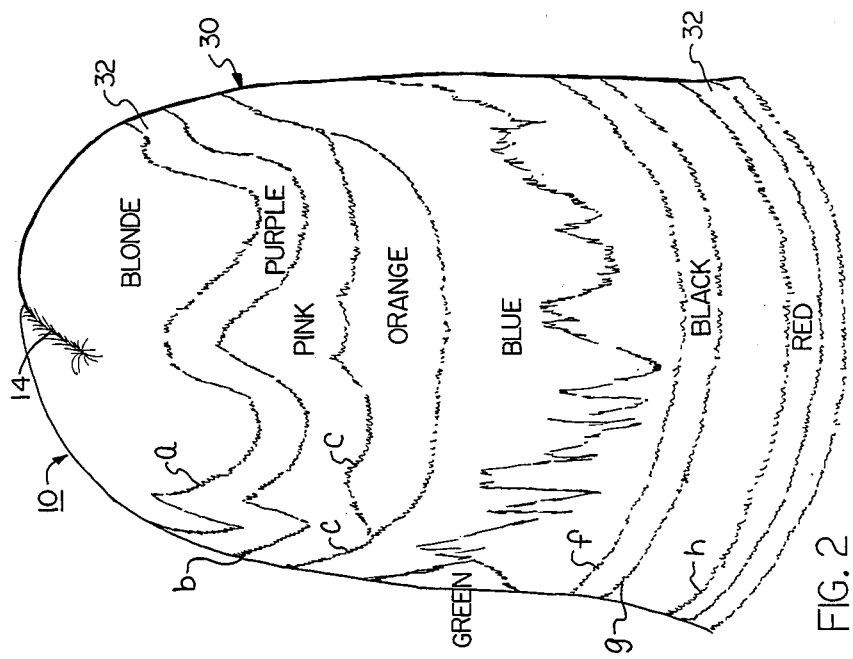
FIG. 1 is a perspective view of a female mannequin according to a preferred embodiment.

FIG. 1 illustrates a preferred female model wherein the mannequin 10 has a face portion 12, scalp 14, neck 16, and hair 18 which is permanently attached to the scalp by conventional means. A base member 20 supports the mannequin on a table or other support means as is well-known in the prior art.

Figure 2:
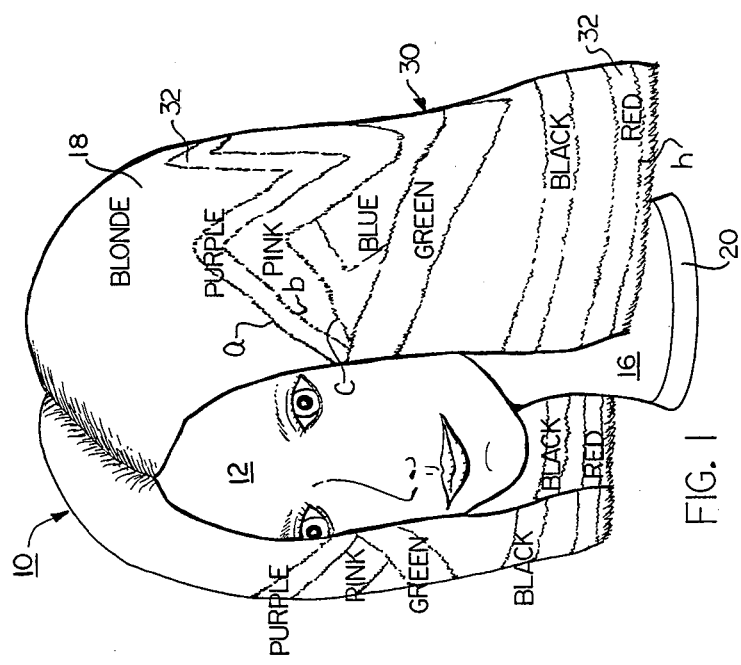
FIG. 2 is a rear view of the mannequin of FIG. 1.
Figure 3:
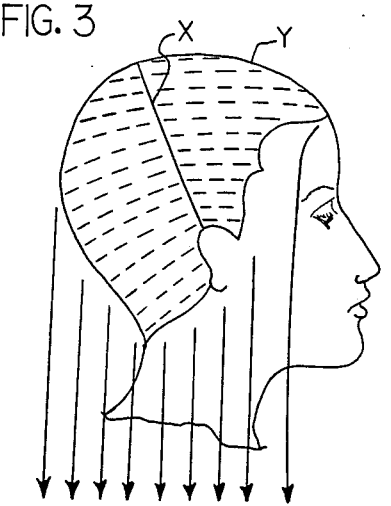
FIGS. 3–8 are diagrammatic drawings of various hair cuts as would be illustrated in the instructional manual.
Figure 4:
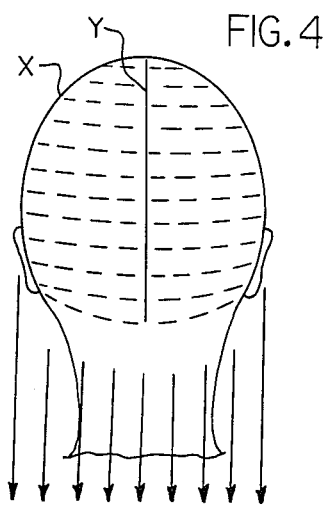
Figure 5:
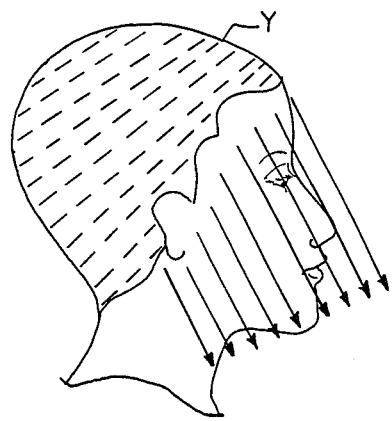
Figure 6:
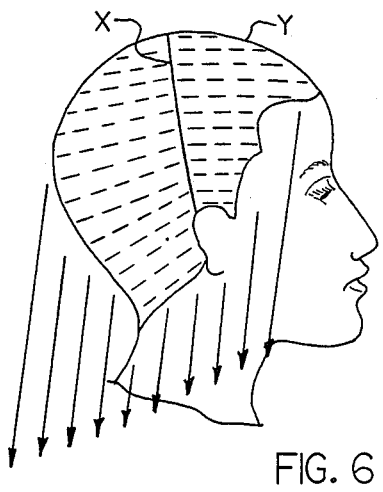
Figure 7:
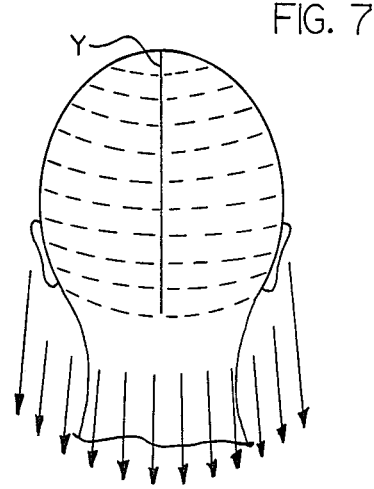

The scalp portion 14 is divided into quadrants by lines "X" extending across the center top from ear to ear, and "Y" which extends from the center front and along the back of the head to the center nape. Although partially visible in FIGS. 1 and 2, lines X and Y are best shown in FIGS. 3 through 8. Color illustrations not being permitted in patent drawings, all such diagrammatical drawings are depicted in black and by the written color indicia of FIGS. 1 and 2. However, in the actual mannequin 10, colors which sharply contrast with the color of the hair and scalp must be used. The colors described herein are for illustration only.

The hair 18 includes a patterned section 30 comprised of a plurality of colored line diagrams 32 whereby the individual strands of hair or sections of hair are imprinted or coated with coloring material to indicate a line of cutting or other work application. Each of the line diagrams is preferably a different color, but it is possible in alternate embodiments to have fewer diagrams, utilize only one color and have them spaced apart, separated by the natural hair color. The coloring material used may be selected from any of the contemporary, multiple colors of dye used for temporarily coloring the hair; may be permanent dyes of any kind compatible with human hair; or acrylics which are applied to the surface of the hair shaft. Further, it is anticipated that invisible inks visible only under ultra violet light might be used.

In the preferred embodiment, however, each diagram 32 is a different color, and because of the erratic path of the cutting lines, creates something of a rainbow effect. For example only, referring to FIGS. 1 and 2, the uppermost line diagram 32, defined by lines "a" and "b" is imprinted or coated with a purple coloring material. This particular line extends around the head. The next section is pink, defined by lines "b" and "c", also extending around the head. An orange portion, substantially in the back section of the head, is defined by intersecting lines "c" and "d". Longer hair styles are denoted by lines "f", "g", and "1".

The ends of the hair, up to the line "h" are (example only) indicated as being red (FIG. 2) and on the actual model, the red line diagram might be approximately three-quarters of an inch to one inch depth. In use, a student would be instructed to take off approximately one-third of the red portion, for a first hair cut. The instructor would then evaluate the cut and the student would be instructed to repeat the cut one or two more times, removing all of the red diagram.

Figure 9:
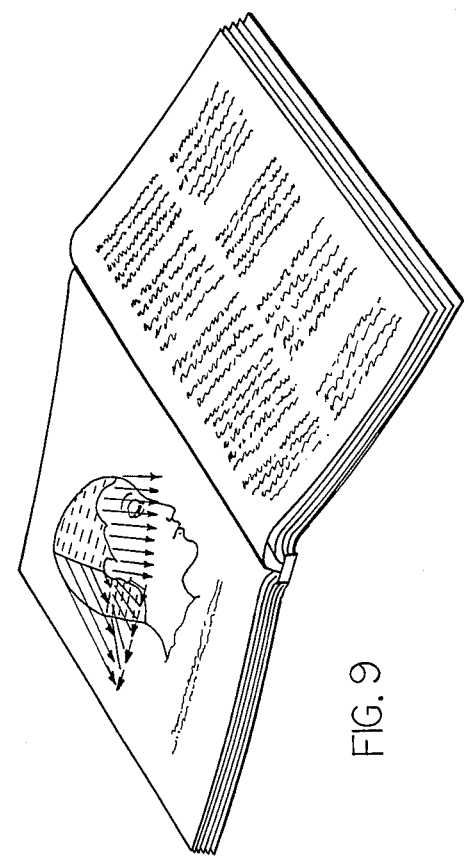
FIG. 9 is a perspective view of one embodiment of the manual, opened to the instructional section related to the diagram of FIG. 8.
Figure 8:
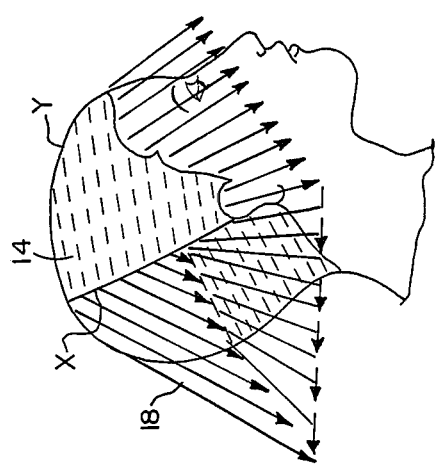

In addition to the instructor's assistance the student refers to a manual 50, FIG. 9, for diagrams of the hair cuts. As illustrated, the manual 50 depicts a cutting diagram 55 showing quadrant division lines "X" and "Y", and a line diagram 60 related to cutting the "orange" section defined by intersecting lines "c" and "d" of FIGS. 2 and 8. Written indicia 65 accompanies the cutting diagram 55 on the opposite page of the manual.

While the above description is directed to mannequins for practicing hair cutting techniques, it is anticipated that other models will be provided for demonstrations of permanent waving, texturing, thinning and the like. Additionally, as stated above, the selection of colors is descriptive only and not meant as a limitation. It is also anticipated that other and further modifications might be made while remaining within the scope of the claims below.

What is claimed is:

1. A mannequin for use as an instructional tool for demonstrating a variety of styling techniques for cosmetology students, the styling techniques including at least hair cutting, permanent waving, blending, texturizing and other such processes; said mannequin including:
   (a) means defining a simulated human head having a scalp portion, and hair attached to said scalp to create a simulated human head with full scalp and hair;
   (b) pattern means applied to individual strands of said hair; said
   pattern means defining at least one styling technique to be performed thereon by a student operator;
   whereby the student operator may follow said pattern means to correctly perform the selected styling technique.

2. A mannequin according to claim 1 wherein said scalp portion includes diagram means for dividing said hair into portions according to a selected styling technique.

3. A mannequin according to claim 1 wherein said pattern means is comprised of means for marking selected portions of said hair to define a specific diagram thereon for indicating areas of hair to be treated according to a selected styling technique.

4. A mannequin according to claim 3 wherein said pattern means further includes means for marking said scalp to define a specific diagram thereon for dividing said hair into portions according to a selected styling technique.

5. A mannequin according to claim 3 wherein said means for marking selected portions of said hair is comprised of:
   (a) at least one line diagram applied to the surface of individual strands of said hair defining a line along which a styling technique is performed;
   (b) said line diagram being applied to said hair surface in a color which contrasts with the color of said hair.

6. A mannequin according to claim 5 and further including a plurality of said line diagrams applied to the surfaces of said hair in a pattern defining a plurality of lines along which a plurality of successive styling techniques are performed.

7. A mannequin according to claim 6 and further including each of said line diagrams being a different color, such that each diagram is easily distinguished from another, each of said colored areas denoting a different styling technique.

8. A mannequin according to claim 7 wherein said line diagrams are of a width permitting a given styling technique to be performed multiple times before said line diagram is destroyed.

9. An educational tool for instructing cosmetology students in a variety of styling techniques, comprising:

(a) a mannequin simulating a human head having a scalp portion, and hair attached to said scalp to create a simulated human head with full scalp and hair;

(b) pattern means applied to individual strands of hair for defining at least one styling technique to be performed by a student operator;

(c) a styling notebook used in conjunction with said mannequin and including:

(i) a first page and a second page related to each styling technique to be demonstrated;

(ii) said first and second pages being positioned in said notebook facing each other such that the student can see both of said pages simultaneously;

(iii) said first page including a diagrammatic chart related to a prescribed one of said pattern means to indicate a line or area of the styling technique to be performed;

(iv) said second page including written indicia describing the selected technique to be performed;

whereby the student may refer to the styling notebook for guidance while performing the selected styling technique on said mannequin.

* * * * *